Figures 4, 13, 14:
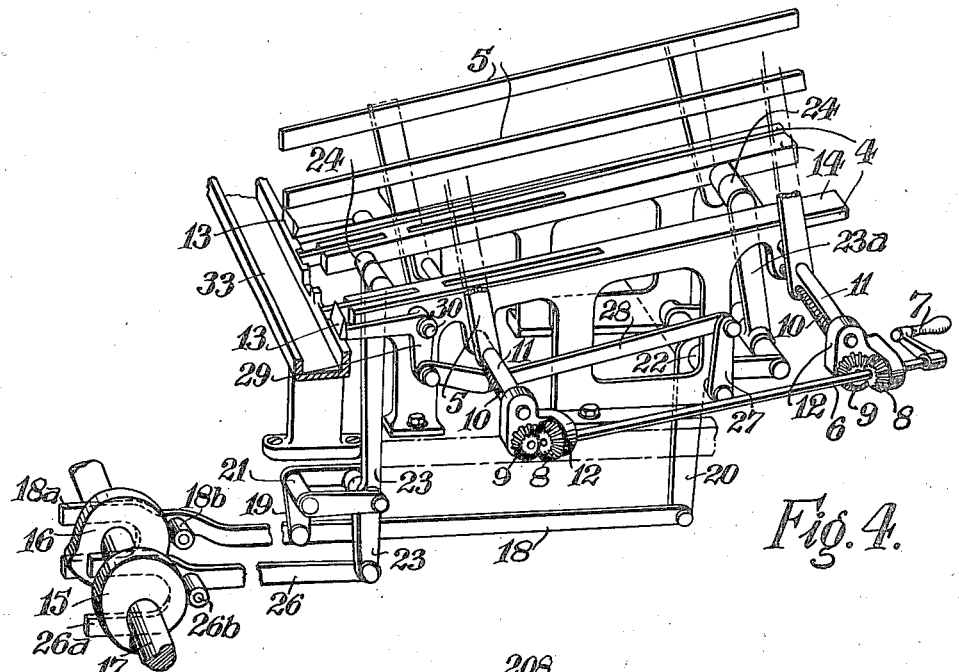

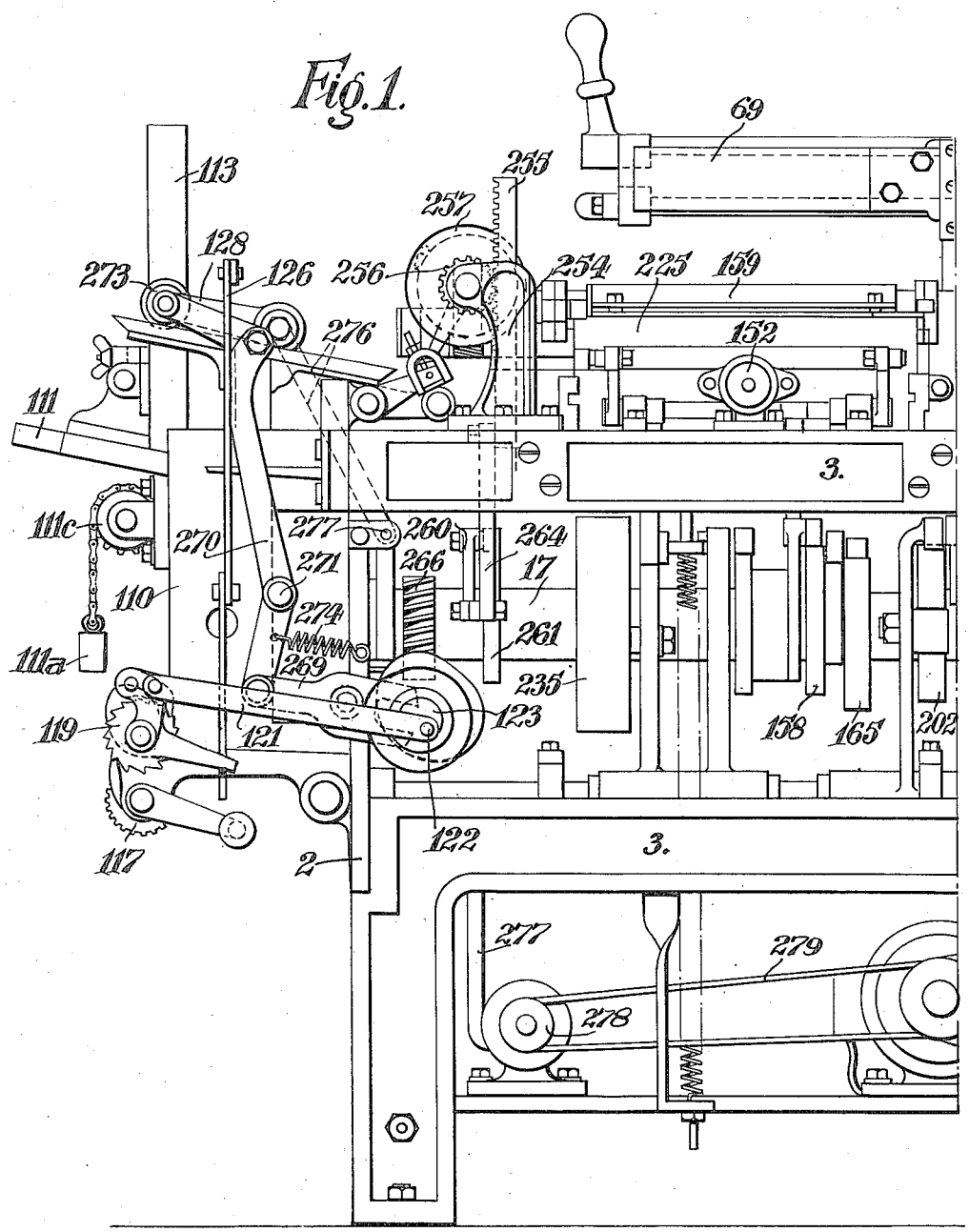

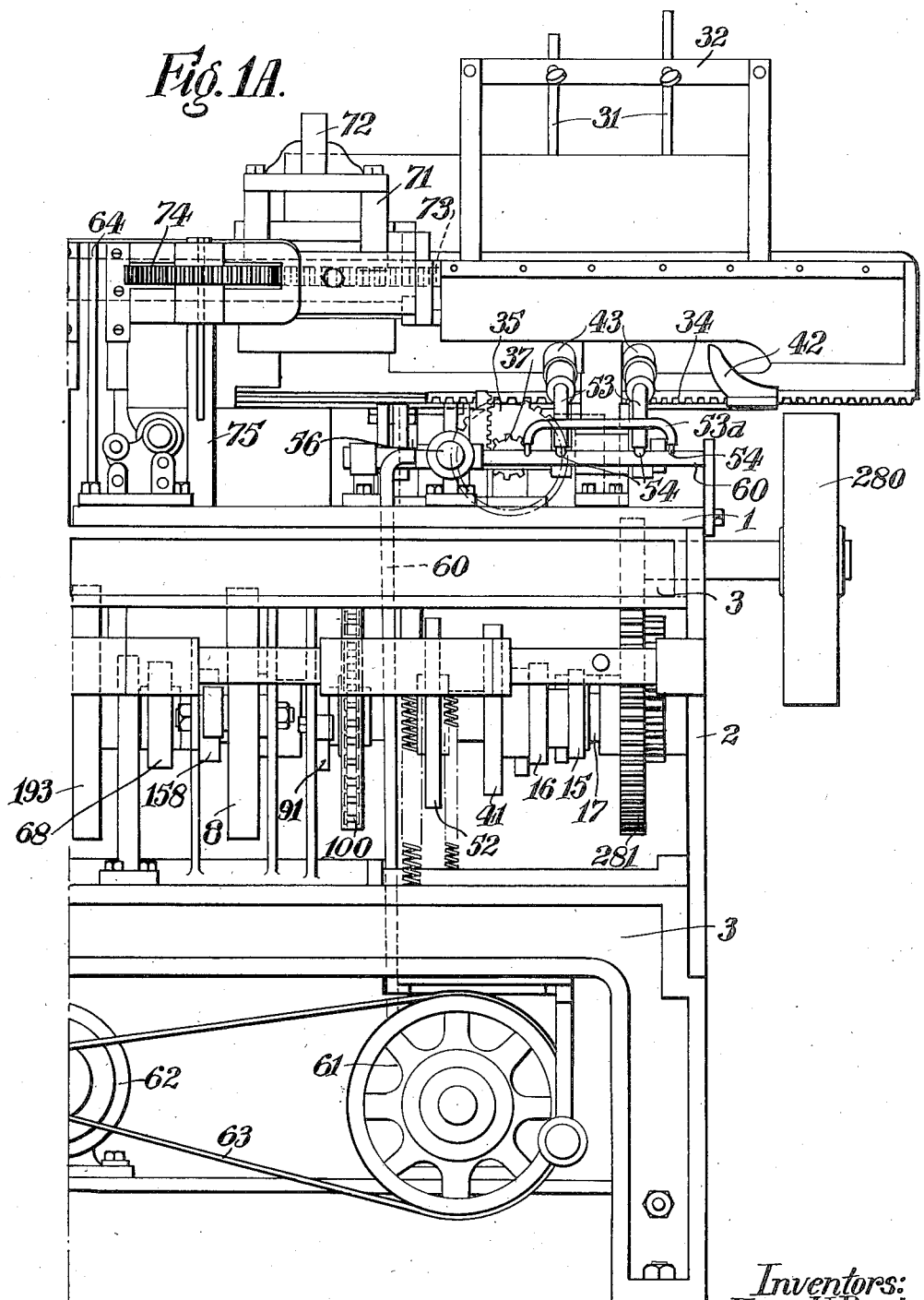

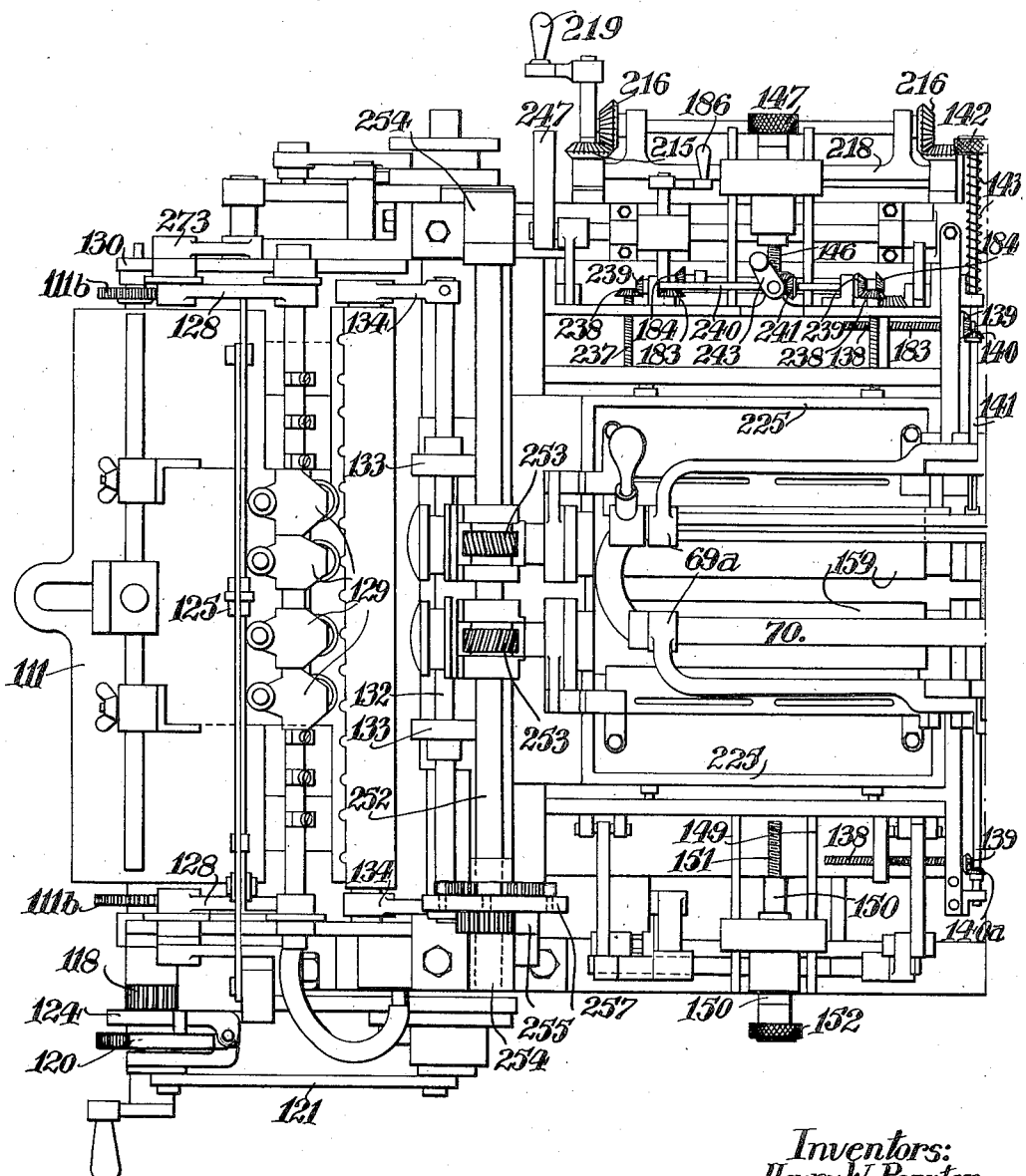

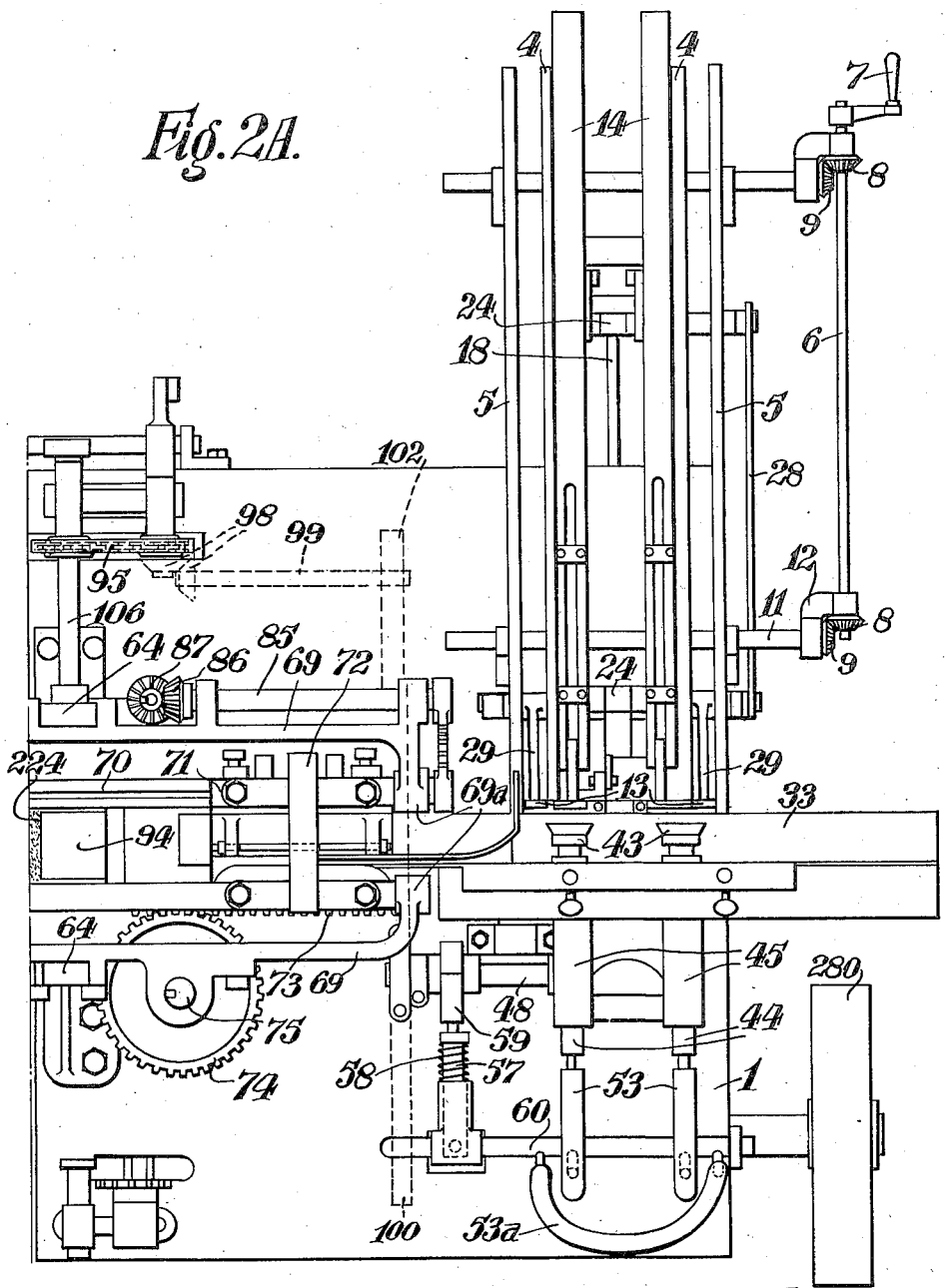

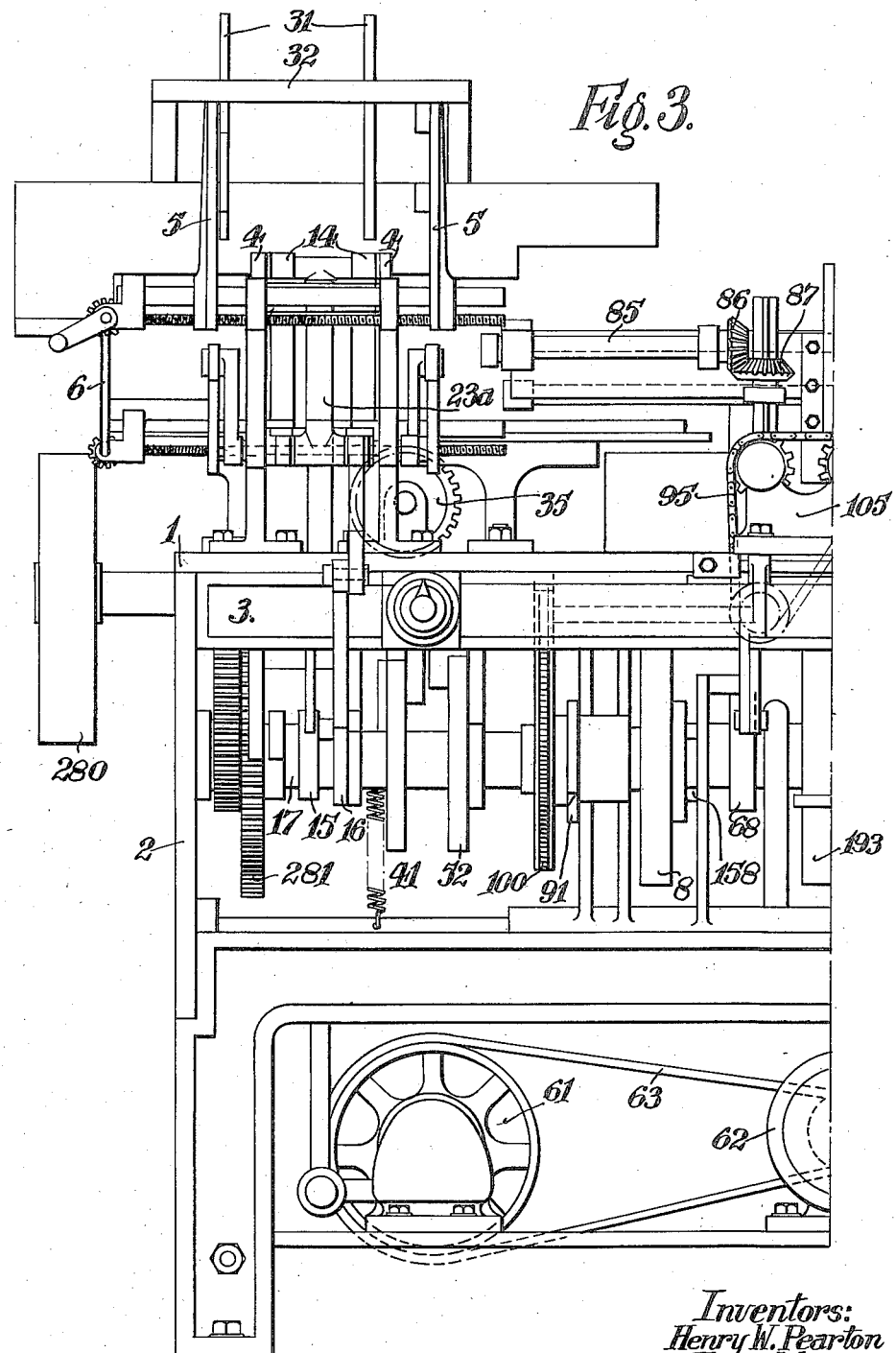

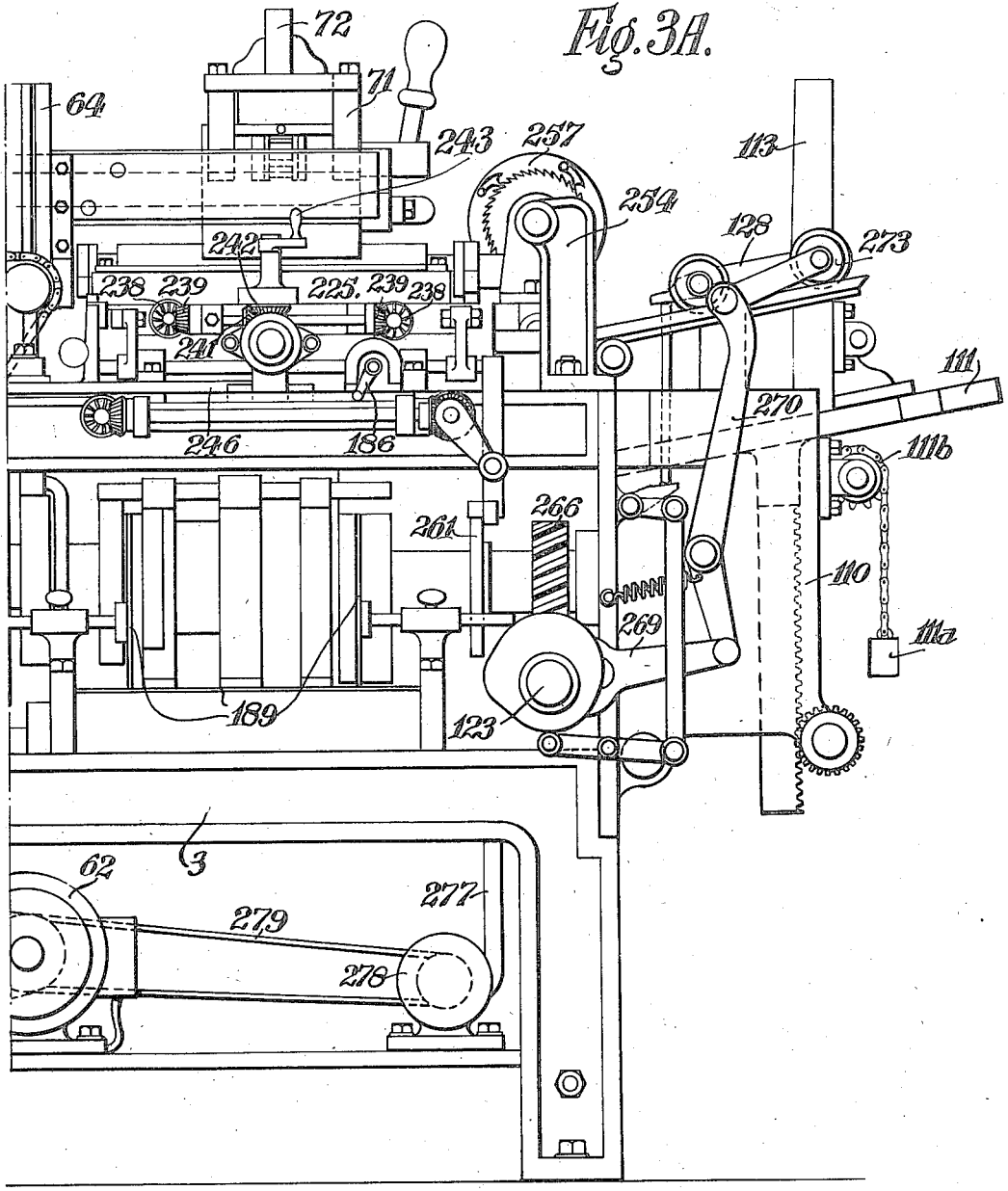

Inventors:
Henry W. Pearton
Harry Mills
per
Attorney.

Inventors:
Henry W. Pearton
Harry Mills
per H B Willson
Attorney.

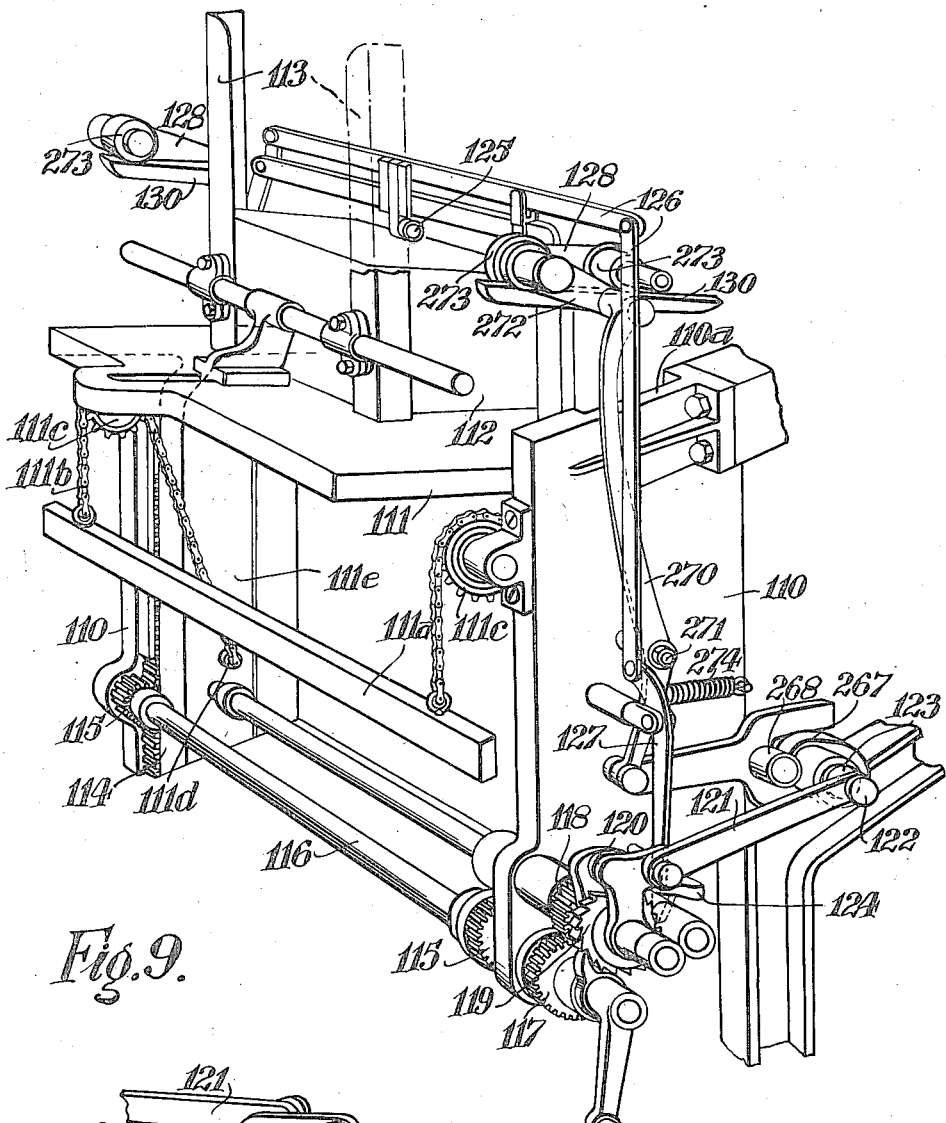

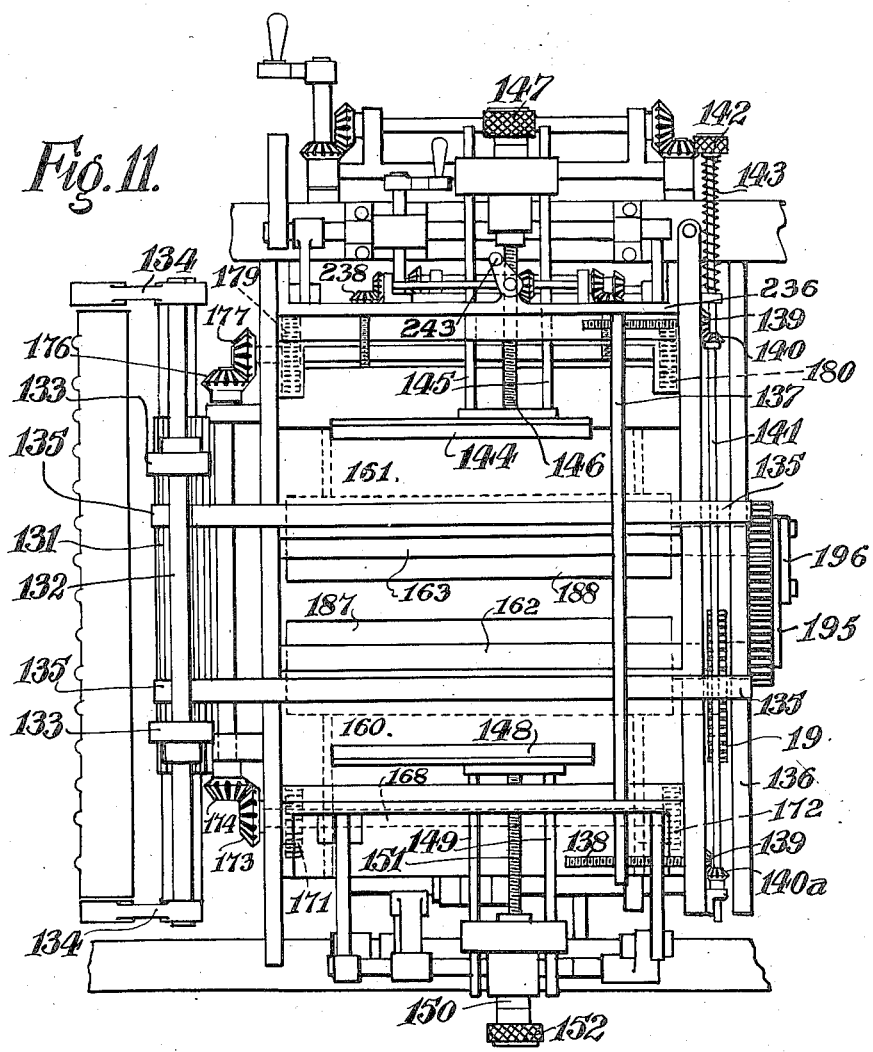

Sept. 17, 1935.   H. W. PEARTON ET AL   2,014,980
BOOKBINDER'S WRAPPERING OR COVERING MACHINE
Filed June 12, 1934   12 Sheets-Sheet 12

Inventors:
Henry W. Pearton
Harry Mills
per H. B. Wilson
Attorney.

Patented Sept. 17, 1935

2,014,980

UNITED STATES PATENT OFFICE 2,014,980

BOOKBINDER'S WRAPPERING OR COVERING MACHINE

Henry William Pearton and Harry Mills, London, England

Application June 12, 1934, Serial No. 730,356
In Great Britain June 15, 1933

13 Claims. (Cl. 11—4)

This invention relates to machines employed in the bookbinding trade for wrappering or covering fillers in the production of books, periodicals or the like, a "filler" being a number of folded sections stitched together.

The term "wrappering" as herein employed means the applying of a sheet of paper, bookcloth or the like to the filler of a book, periodical or the like so that it constitutes a cover adhesively secured thereto along the back of the filler and, it may be, also along narrow areas of the front and rear sheets of the filler, these narrow areas being closely adjacent the back of the filler.

On the other hand, the term "covering" as herein employed means the applying of a sheet of paper, bookcloth or the like to the filler of a book or the like so that it constitutes a cover adhesively secured to said filler along the back thereof and also over the whole areas of the front and rear sheets of the filler.

The object of the present invention is to provide an improved machine by means of which the wrappering or covering of the fillers of books, periodicals or the like may be automatically effected in a rapid and satisfactory manner.

According to the invention the improved machine comprises means for traversing a book or like filler longitudinally, with the back directed downwards, to a position in which it is disposed above a sheet of paper, bookcloth or the like supplied from a pile of such sheets by suitable means, means for applying a coating of adhesive to the back of said filler as it is being traversed, means for pressing the back of the filler on to the said sheet of paper or the like, means for folding the said sheet upwardly around the filler and means for delivering the filler thus provided with a cover to a discharge chute or the like.

The invention also consists in a machine according to the preceding paragraph wherein additional means are provided for applying adhesive to the end sheets of the filler either as strips disposed adjacent the back of the filler or as coatings extending over the whole areas of the said sheets, means being provided for pressing the upwardly folded cover sheet on to the said end sheets of the book filler during its delivery to the discharge chute or the like.

In order that the invention may be readily understood a machine constructed in accordance therewith will now be described, by way of example, reference being had to the accompanying drawings, wherein:—

Figure 5:
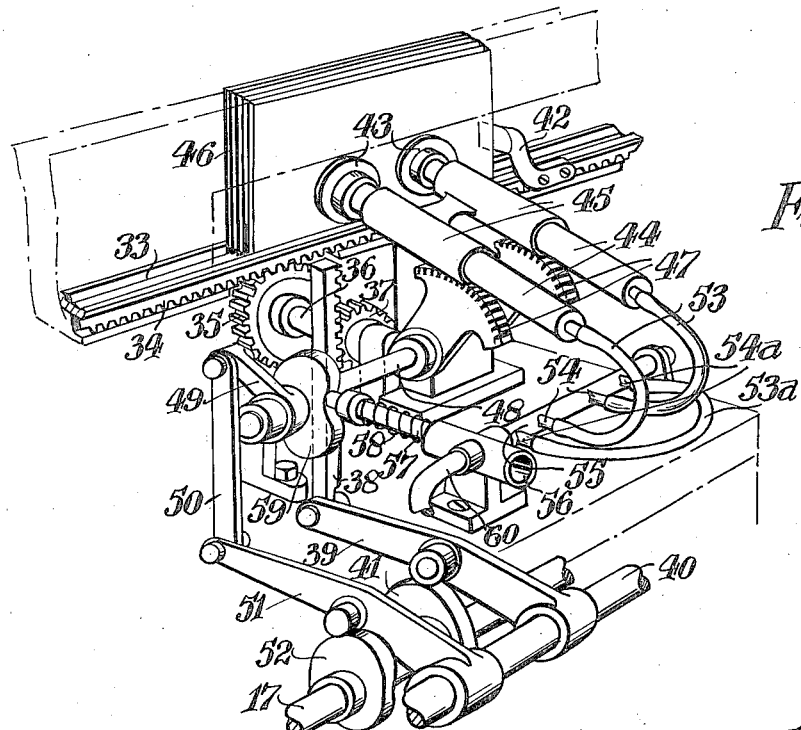
Figure 6:
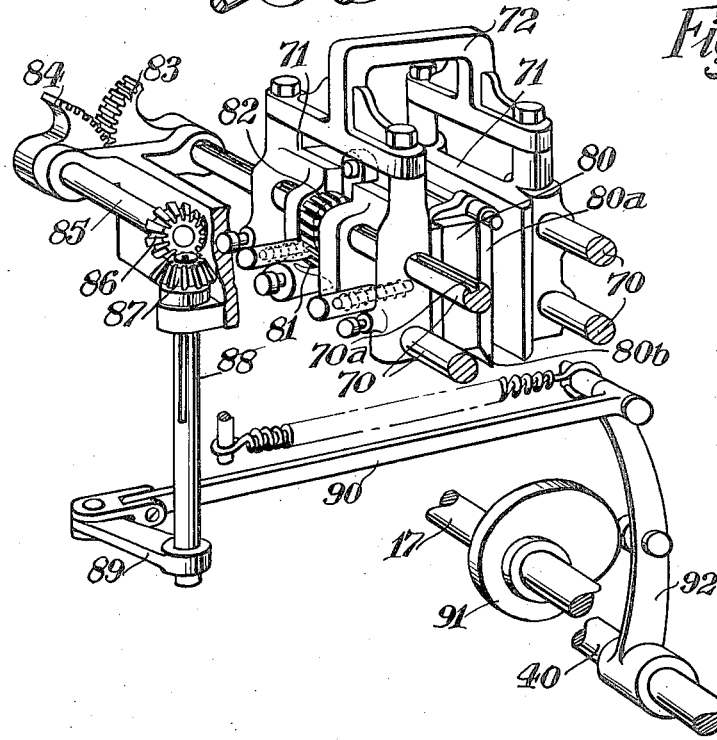
Figure 7:
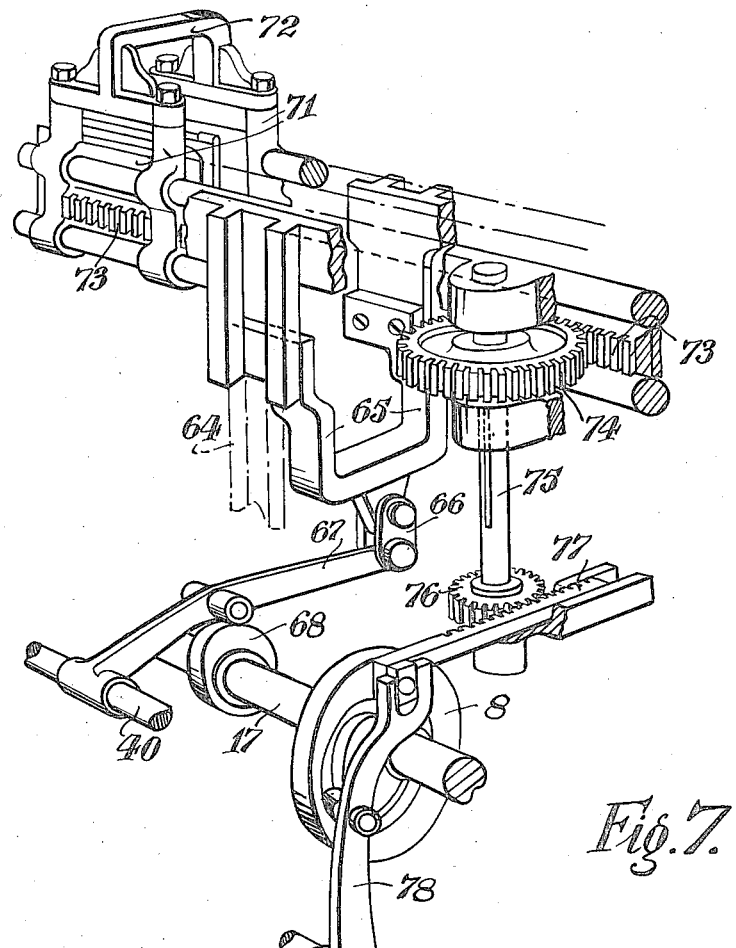
Figure 8:
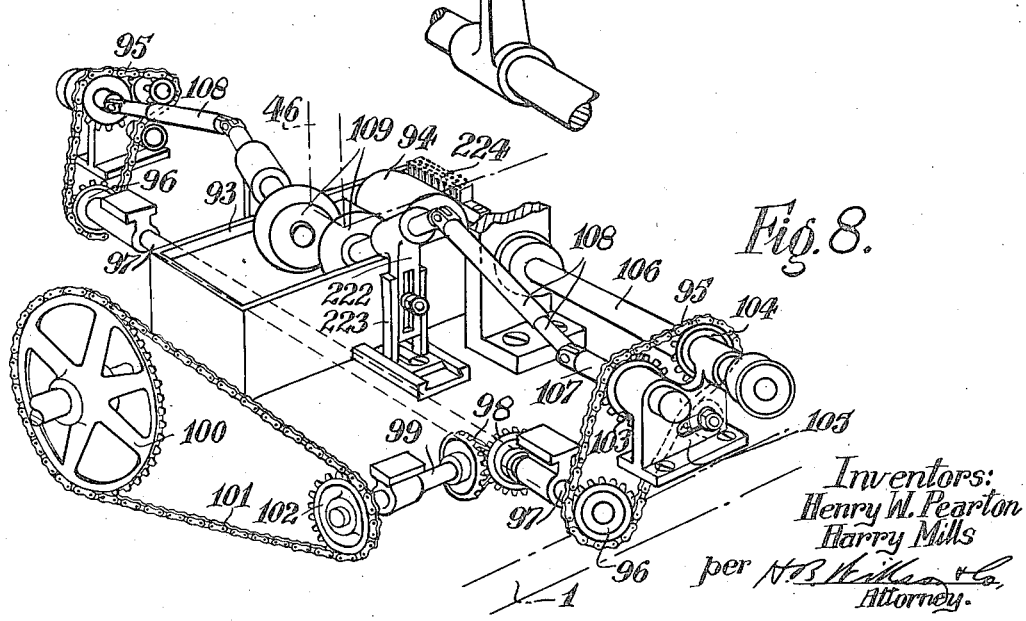
Figure 15:
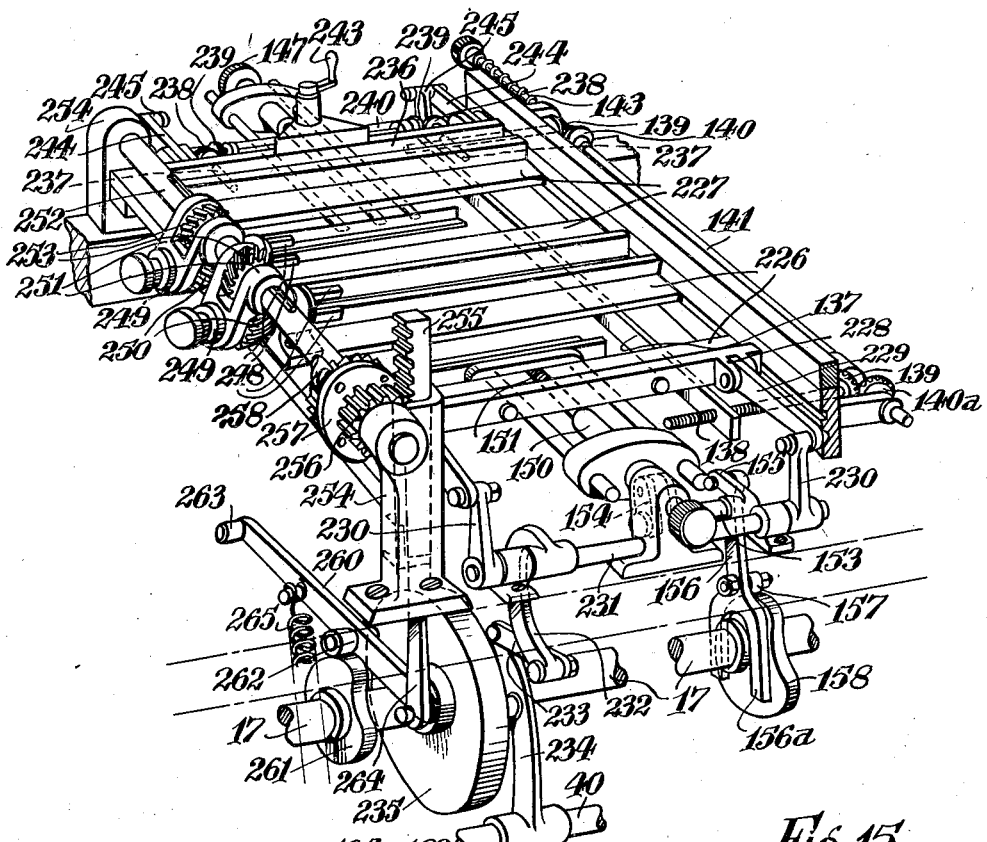
Figure 12:
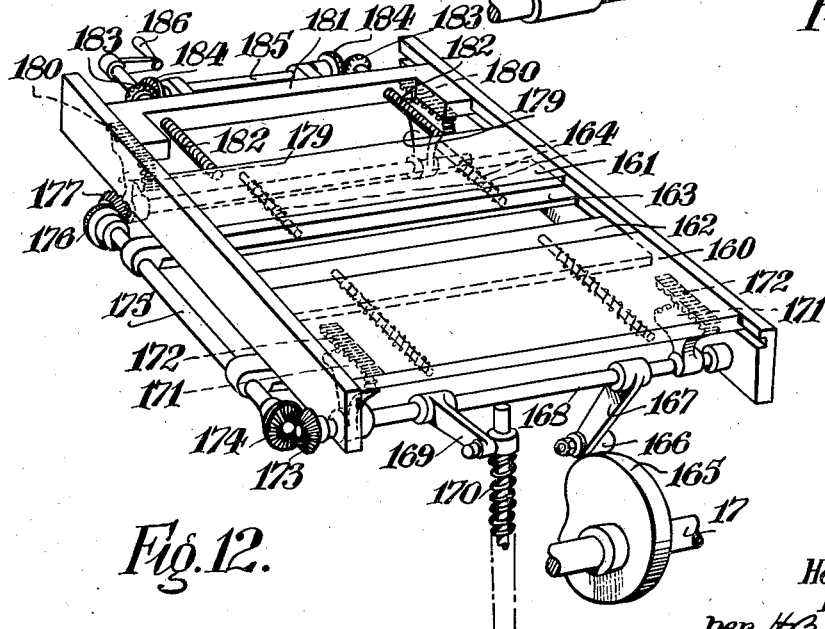

Figs. 1 and 1A are the left-hand and right-hand ends, respectively, of a front elevation of the machine, Figs. 2 and 2A are the left-hand and right-hand ends, respectively, of a plan view thereof, Figs 3 and 3A are the left-hand and right-hand ends, respectively, of a rear elevation of the machine, Fig. 4 is a somewhat diagrammatic perspective view of the book-filler supporting rack and associated elements, taken from the right-hand end of the machine, Fig. 5 is a similar view of means for successively transferring the fillers from the rack to a supporting member, taken from the front of the machine, Fig. 6 is a somewhat diagrammatic perspective view of clamping means to which the fillers are adapted to be fed along the supporting member, taken from the rear of the machine, Fig. 7 is a somewhat diagrammatic perspective view of means for traversing the filler-clamping means, taken from the front of the machine, Fig. 8 is a similar view of glue-applying means over which the filler passes during the traverse of the filler-clamping means, taken from the rear of the machine, additional glue-applying means to which reference is made hereinafter being also shown in this view, Fig. 9 is a somewhat diagrammatic perspective view of cover-feeding means, taken from the left-hand end of the machine, Fig. 10 is a similar view of a detail, taken in the opposite direction to Fig. 9, Fig. 11 is a plan view of cover-supporting and cover-registering means to which the covers are fed successively by the means shown in Fig. 9, some elements which are normally disposed above the supporting and registering means having been removed, Fig. 12 is a somewhat diagrammatic perspective view of part of the apparatus shown in Fig. 11, comprising cover-supporting and nipping means, taken from the front of the machine, Fig. 13 is a similar view of pressure-applying rollers disposed beneath the cover-supporting and nipping means, Fig. 14 is a fragmentary vertical section of a detail, and Fig. 15 is a somewhat diagrammatic perspective view of apparatus shown in Fig. 11, taken from the front of the machine.

Considering firstly the sequence of operations involved in employing the machine according to the invention for wrappering a book filler:—

The book fillers are fed automatically, one at a time, from a stack thereof to a longitudinally reciprocable element so that each arrives thereon with its back directed downwards and its medial plane extending in the direction of movement of the said element. At the correct moment the said element is actuated to bring the filler thereon to a position in which the upper part thereof may be gripped between clamping means adapted to reciprocate in a direction parallel with the direction of movement of the element referred to and the clamping means are operated to grip the filler and traverse same to a position in which it is disposed above a table or the like on to which a sheet of paper or the like has meanwhile been fed by suitable means from a pile or stack of such sheets. During its traverse the filler is carried over means which apply a thin layer of an adhesive to the back thereof and when it has reached the end of its travel it is lowered into engagement with means which, the filler clamping means then being released, press the back of the filler on to the sheet already in place on the table or the like, said sheet having, of course, been correctly positioned by the use of registering means and the like.

When the filler is pressed on the sheet, nipping means are actuated to fold the sheet upwardly about the filler and nip the same on to the the latter in the neighborhood of the back, whereupon the nipping means are released and the filler with the adhering cover is pressed downwardly through an opening in the table or the like to enter between a pair of pressing rollers which feed the wrappered filler downwardly into a chute or the like.

This sequence of operations also takes place if the wrappering operation is to result in a book filler having a cover adhering thereto both along the back of the filler and along narrow strips of the end sheets of the latter disposed adjacent said back, but in this case additional adhesive-applying means are provided for producing the necessary extra strips of adhesive on the filler as this completes the last portion of its traverse.

When covering a book filler, however, the general sequence of operations is modified slightly in that the application of a thin coating of adhesive to the entire surface of the first and last sheets of the book filler is partly effected during the descent of the filler into contact with the sheet which is to constitute the cover and is completed during the further descent of the filler and cover, additional adhesive-applying means being provided over the table or the like to which the sheet or cover is adapted to be supplied.

It will be understood that the correct sequences of the various operations are ensured by a suitable choice of the gears, cams, levers or the like which may be employed in producing the movements of the parts involved and the following more detailed description of the machine illustrated in the drawings will be particularly directed to the features of construction, considered as such, without specifying shapes of cams, ratios of gearing or like details necessary to produce the results aimed at.

The machine as a whole (see Figs. 1, 1A, 2, 2A, 3 and 3A) is of substantially rectangular shape in plan view, the main framing consisting of a horizontal table 1 carried at the upper ends of two end plates 2 connected by upper and lower longitudinally extending side members 3 of channel or other suitable section.

Disposed at the right-hand end of the table 1 is an inclined book-filler supporting rack (see Figs. 2A and 4) comprising two parallel fixed bars or rails 4 spaced upwardly from the table and extending transversely thereof from about the longitudinal centre line of the table to a suitable distance beyond the rear edge of the latter, the end of the rack adjacent the centre of the table being the lower end.

The book fillers to be operated upon (not shown) are stacked on the said rack, being supplied thereto by hand or in some other suitable way, with their backs resting on the bars or rails 4 and their medial planes extending transversely of and substantially at right angles to the plane containing the upper surfaces of the said bars or rails. Suitable lateral guides 5 are provided on the rack and these are adjustable as regards their distance apart to suit the sizes of book filler upon which the machine is to operate by means of a spindle 6 adapted to be operated by a crank-handle 7 and carrying bevel gears 8 each meshing with a bevel gear 9 secured on the end of a screw-threaded spindle 10 threadedly engaged with the lateral guides 5, which latter are slidably mounted on rods 11 adapted to support bracket members 12 constituting bearings for the spindle 6 and the screwed spindles 10. The latter are each formed with a right-hand thread and a left-hand thread engaging respectively the one and the other lateral guide 5 so that rotation of the spindle 6 in the one or other direction produces motion of the guides 5 towards or away from each other.

Means are provided for feeding the fillers down the rack against removable stops 13 provided at the lower ends of the bars or rails 4, such means comprising an adidtional pair of bars 14 adapted to be raised between the fixed bars or rails 4 of the rack into engagement with the backs of the fillers supported on the latter and then displaced longitudinally to advance the stack of fillers as a whole until the leading filler is arrested by the stops 13 referred to. These stops 13 are so interconnected with the means operating the feed bars 14 that they are removed out of the path of the leading filler when the said feed bars are lowered out of engagement with the fillers preparatory to being returned to their initial position by a longitudinal movement in the reverse direction.

The illustrated means for producing the desired movements of the feed bars 14 and stops 13 comprise (see Fig. 4) a pair of cams 15 and 16 mounted on a main cam shaft 17 extending longitudinally of the machine beneath the table 1 (see Figs. 1, 1A and 2, 2A). The cam 16 acts through a link 18, which has a forked end 18a embracing the shaft 17 and a roller 18b bearing on the periphery of the cam under the action of the weight of the parts to be moved thereby, on the lower ends of a pair of bell-crank levers 19, 20 each of which is pivotally mounted at the bend (as at 21 and 22, respectively) on a fixed part of the machine frame. The other extremities of the bell-crank levers 19, 20 each have pivotally mounted thereon one of a pair of parallel links 23, 23a, the upper ends of which are pivotally mounted on transversely extending rods 24 which connect the two feed bars 14 adjacent their ends. The link 23 is extended downwardly below its pivotal connection with the bell-crank lever 19 as a tail-lever 25 to the end of which is pivotally connected a link 26 adapted to be operated by the cam 15, said link 26 having a forked end 26a embracing the cam shaft 17 and a roller 20b bearing on the periphery of the cam 15 under the action of the weight of the parts which are to be moved by means thereof.

It will be seen that the displacement of the link 18 to the right in Fig. 4 by means of cam 16 will rock the bell-crank levers 19, 20 anti-clockwise about their pivots 21, 22 and cause the links 23, 23a to raise the feed bars 14 and that the then occurring displacement of the link 26 to the right will rock the lever and link member 25, 23 in the anti-clockwise direction about its pivotal connection to the bell-crank lever 19 and thus produce motion of the raised feed bars 14 to the left of Fig. 4.

The cams 15, 16 are so shaped and timed that the feed bars 14 are lowered before they are returned to the initial position, after executing a predetermined length of travel longitudinally. Radial arms 27 secured one on each end of the pivot 22 of the bell-crank lever 20 are connected by links 28 to the downwardly directed arms of bell-crank levers 29 which are pivoted at 30 on the fixed bars 4 above referred to and carry at the free ends of their other arms the stops 13.

Hence, when the feed bars 14 are lowered, the stops 13 are removed downwardly out of the path of the leading filler supported on the rack 4, 5, 14, while, when the bars 14 are raised preparatory to being displaced longitudinally towards the center line of the machine, the stops 13 are also raised to the operative position.

Additional means are, of course, provided for engaging the top edge of the leading filler to prevent the latter from falling off from the end of the rack, said means comprising a pair of vertically disposed rods 31 adjustably mounted in a frame 32 (see Figs. 1A, 2A and 3) so that their lower ends project slightly into the path of the upper edges of the book fillers on the rack.

Arranged along the longitudinal center line of the machine table 1 is a fixed horizontal channel-section plate 33 (Figs. 4 and 5) spaced upwardly from the table by such an amount that the smooth upper surface of its channel is but a short distance below the level of the adjacent inner ends of the upper surfaces of the fixed bars or rails 4 of the rack, the said plate terminating at its inner end somewhat short of the center of length of the machine. A rack bar 34 (Figs. 5 and 1A) is suitably mounted just beneath said plate to be capable of movement parallel therewith and longitudinally thereof, teeth formed on the underside of said bar 34 meshing with a pinion 35 secured on a short horizontal shaft 36 disposed transversely of the machine table 1 and carrying a further pinion 37 which meshes with the teeth of a vertically slidable rack bar 38 adapted to be reciprocated by lever mechanism 39 rocked about a shaft 40 by a cam 41 on the main cam shaft 17 extending longitudinally of the machine beneath the table 1.

A finger 42 (Figs. 1A and 5) adjustably secured on the horizontally movable rack bar 34 extends from the latter over the edge of the fixed horizontal plate 33 to terminate in a transversely disposed portion arranged close to the upper surface of the latter.

The leading book filler on the rack 4, 14, above referred to is transferred therefrom on to the upper surface of the horizontal plate 33 at the correct period in the operation of the machine by means of a suction device adapted to pull the said filler off the end of the rack on to the plate.

This suction device, as can be clearly seen from Fig. 5, comprises a pair of suction cups 43 mounted on the upper ends of a pair of inclined tubular plungers 44 mounted for longitudinal reciprocation in a suitable guide bracket 45 so that the suction cups 43 may be brought into contact with the leading filler 46 on the supporting rack 4, 14, while suction is being applied through the plungers 44. The latter are adapted to be reciprocated by means of toothed segments 47 meshing with rack teeth formed on the undersides of the plungers and mounted on a short horizontally disposed shaft 48 disposed longitudinally of the table 1 and having secured thereon a radial arm 49 adapted to be operated, through a link 50 and a lever 51 pivoted on the shaft 40, from a cam 52 mounted on the main cam shaft 17.

The suction connections from the plungers 44 comprise flexible tubes 53 engaged over nipples 54 on a tube 55 which is closed at one end and secured on the machine table 1, said tube 55 opening laterally into an open-ended cylinder 56 within which a cylindrical valve 57 is adapted to be reciprocated, against the action of a spring 58, by means of a cam 59 secured on the shaft 48. The valve 57 has a transverse bore (not shown) for establishing communication between the tube 55 and a suction pipe 60 leading to an exhausting pump 61 which is mounted in the base of the machine (Fig. 1A) and driven by an electric motor 62 through a belt 63. Furthermore, the length of the valve 57 is such that it can be moved to a position in which the openings to the pipe 60 and tube 55 in the wall of the cylinder 56 are uncovered and left open to the atmosphere through the open end of the said cylinder 56, whereby the suction exerted through the cups 43 is interrupted.

In order to obtain the required action, the cam 59 is so shaped and so disposed relatively to the segments 47 that suction is established in the cups 43 as the plungers 44 are advanced toward the filler 46 on the rack 4, 14, and interrupted as the plungers are moved back, the result being that the leading filler on the rack is pulled off the latter and allowed to drop on to the plate 33.

It will be noted from Fig. 5 that two additional nipples 54a are shown provided on the tube 55, these being employed to apply suction at two further cups (not shown) when large books are being dealt with, in which case all four suction cups would be mounted on a bar carried from the plungers 44. When not required the additional nipples 54a may be connected by a tube 53a (as shown).

When the leading filler 46 has been transferred from the rack 4, 14 (Fig. 4) to the plate 33, the horizontally movable rack bar 34 is then operated to cause the finger 42 secured thereon to engage the outer end of the filler 46 supported on the plate 33 and displace same longitudinally thereof, towards the centre of length of the machine, to a position in which the upper part of the book is disposed between clamping and traversing means now to be described.

At about the centre of length of the machine and symmetrically to the longitudinal centre line thereof are mounted a pair of vertical guides 64 (Figs. 1A, 2A and 3A) between which is adapted to slide vertically a U-shaped yoke 65 (see Fig. 7) having its bend disposed downwardly and connected by a link 66 to a lever 67 which is rocked about the shaft 40, by means of a cam 68 on the main cam shaft 17, for operating said yoke. The upper end of each limb of the yoke 65 has secured thereto the centre portion of an elongated horizontally extending bracket member 69, the bracket members being parallel and directed longitudinally of the machine. At each end of each bracket member is an inwardly directed block 69a and there extend between the two blocks of each bracket 69 a pair of horizontal guide rods 70 arranged with their axes in the same vertical plane. Mounted slidably on each pair of guide rods is a vertically disposed plate member 71 having its inner surface parallel with the longitudinal centre line of the machine table, the two plate members 71 being connected at their upper ends by a bridge or yoke 72 so that they may move in unison.

The plate member 71 mounted on the guide rods 70 on that side of the centre line of the machine table which is remote from the means for supporting and feeding the book fillers has secured to its outer surface a horizontally extending rack bar 73, the toothed outer face of which is in mesh with a gear wheel 74 adapted to be rotated in a horizontal plane by means of a vertical shaft 75 on which it is free to move longitudinally. The lower end of said shaft 75 is provided with a spur pinion 76 disposed beneath the machine table and meshing with a rack bar 77 adapted to be reciprocated transversely of the machine by means of a lever 78 operated by a cam 79 on the main cam shaft 17. Reciprocation of the rack bar 77 beneath the machine table, as will be understood, produces reciprocation of the plate members 71 along their guide rods 70.

The other plate member 71 of the pair, i. e. that not having the rack 73 secured thereto, has a movable clamping box 80 mounted thereon (see Fig. 6) so that it can move towards and away from the opposite plate member of the pair, the movements of the clamping box 80 being produced by means of a rack bar 81 secured thereto by its one end and extending outwardly therefrom through the adjacent plate member 71 to be engaged by a pinion 82 mounted on the upper guide rod 70 of said plate member. This upper guide rod is rotatably mounted and formed with a longitudinally extending keyway 70a by means of which the said pinion 82 is connected therewith so as to be capable of relative movement longitudinally while being forced to rotate with said guide rod.

At its one end said longitudinally grooved rod 70 has keyed thereon a toothed segment 83 meshing with a similar toothed segment 84 secured on the adjacent end of a short shaft 85 disposed parallel with the guide rod and rotatably mounted in the bracket 69 carrying same, a bevel gear 86 secured on the said shaft 85 meshing with a bevel gear 87 slidable on but not rotatable with respect to a vertical shaft 88 which at its lower end carries a radial arm 89 adapted to be rocked by the reciprocation of a link 90 actuated from a cam 91 on the main cam shaft 17 by means of a lever 92.

Reciprocation of the said link 90, as will be understood, will cause movement of the clamping box 80 towards or from the opposite plate member 71 irrespective of the position of the plate members longitudinally of their guide rods 70.

The clamping and traversing means just described are actuated to cause the book filler which has been brought to the correct forward position on the horizontal plate 33 (Fig. 4) in the manner set forth above, to be clamped between the clamping box 80 and the opposite plate member 71 by its upper portion and then traversed the full length of the guide rods 70 while still so clamped.

During its traverse the back of the filler has applied thereto a layer of adhesive, a tray or tank 93 (see Fig. 8) containing such adhesive being suitably supported between the limbs of the yoke 65 carrying the guide rods 70 for the clamping plates 71 and a driven roller 94, immersed over the lower part of its circumference in said adhesive, being provided at such a height as to apply the latter to the back of the filler (one such filler 46 being indicated in chain-dotted lines in Fig. 8).

The drive to the shaft of the adhesive-applying roller is preferably such that the height of the tank 93 and roller 94 may be adjusted slightly in accordance with requirements without affecting the rotation of the roller and comprises a chain drive 95 from a sprocket 96 arranged on a shaft 97 disposed transversely beneath the machine table 1, said shaft being driven by bevel gearing 98 from a longitudinally extending shaft 99 in turn driven from the main cam shaft 17 by chain-and-sprocket gearing 100, 101, 102. In the chain drive referred to the chain 95 is arranged to run in succession over each of two sprockets 103, 104 secured on parallel shafts 106, 107 carried in a vertical bracket 105 on the machine table 1, the one shaft 106 being connected to the shaft (not shown) of the adhesive-applying roller 94 by a coupling allowing said connected shafts to run out of alignment and the other shaft 107 being utilized for driving by means of a universally jointed telescopic shaft 108 one of a pair of additional adhesive-applying discs 109, to be referred to hereinafter, when such are employed.

When the filler with the coating of adhesive applied to its back reaches the end of its traverse it is disposed vertically above a cover sheet of paper, bookcloth or the like which has meanwhile been fed from a pile of such sheets in the manner now to be described with reference to Figs. 9, 10, 11 and 12.

A pair of vertical bracket members 110 (Figs. 1, 3 and 9) are secured on the end plate 2 of the machine frame remote from the filler feeding means and carry between them in suitable guides 110a a vertically slidable substantially horizontal table 111 adapted to support a pile 112 of cover sheets suitably positioned by a pair of corner posts 113 or the like of angle section. This table, which is counterweighted by a bar 111a supported from chains 111b passing over sprocket wheels 111c mounted on the bracket members 110, said chains being attached to pins 111d mounted on downward extensions 111e of the table, is adapted to be fed upwardly by known mechanism so as to maintain the height of the top sheet of the pile substantially constant, such mechanism comprising, for example, a pair of racks 114 secured to the table 111 and engaged by pinions 115 secured on a shaft 116 extending between the bracket members 110, said shafts 116 carrying a gear wheel 117 driven from a gear wheel 118 secured to a ratchet wheel 119, a pawl 120 (Fig. 10) constantly reciprocated by a link 121 from an eccentric pin 122 mounted on the end of a transverse shaft 123 (to be referred to hereinafter), and a member 124 normally preventing said pawl 120 from engaging with the ratchet wheel 119 but allowing such engagement when a feeler 125 controlling said member 124 through linkwork 126 and a pivoted hooked lever 127 and adapted to bear on the top of the pile 112 drops below a predetermined level and thus causes the hooked lever 127 to engage beneath, and hold inoperative, the member 124.

Mounted on the bracket members 110 so as to reciprocate in a plane parallel with and slightly above that of the topmost sheet of the pile 112 is a carriage 128 supporting suction devices 129 (Fig. 2) which are adapted to be lowered on to the topmost sheet (by the descent of the whole carriage 128 and the guides 130 therefor) when they are furthest from the machine table proper, raise said sheet by the suction then applied therethrough, traverse said sheet towards the machine table 1 and release same, due to the breaking of the vacuum, when the leading edge of the sheet has arrived over a constantly rotating transverse roller 131 (Fig. 11) disposed adjacent the end plate of the machine.

Arranged above the said roller 131 is a transverse shaft 132 having two or more spaced rollers 133 mounted thereon so as to be adjustable longitudinally thereof, this shaft being carried in bearings on the ends of pivoted levers 134 or the like so that it may be caused to drop at the correct period from its normal position, in which the rollers 133 are some little distance above the cover sheet resting on the constantly rotating roller 131, into a position in which the rollers 133 carried by the shaft come to bear on said cover sheet, whereupon this is advanced by the rotation of the roller 131. A number of conveyor tapes 135 passed around said constantly rotating roller and around a further idle roller 136 disposed transversely of the machine are arranged so that their upper runs extend horizontally, longitudinally of the machine, close above the upper surface of a longitudinally divided horizontal table to be described hereinafter.

The cover sheet fed forwards by the roller mechanism 131, 133 referred to is carried longitudinally into the machine by the conveyor tapes 135 until its leading edge strikes against a suitable end-registering device, shown in Figs. 11 and 15 as a squared transverse bar 137 which can be adjusted longitudinally of the machine by means of screwed spindles 138 threaded into said bar and carrying bevel gears 139 adapted to be engaged by bevel gears 140 and 140a mounted on an axially displaceable transverse spindle 141 provided with an operating knob 142. The bevel gear 140 is pinned on the spindle 141 to move therewith but the gear 140a has a sliding keyway connection with said spindle, whereby the axial displacement of the spindle 141 against the action of a spring 143 enables the bar 137 to be adjusted at one end only when desired.

An adjustable side-registering member 144, mounted on guide rods 145 and adjusted by means of a threaded spindle 146 and knob 147, is mounted to the rear of the longitudinal axis of the machine and the cover sheet, which has been correctly registered longitudinally against the bar 137, is registered laterally against said member 144 by inward movement of a further side-registering member 148 mounted on guide rods 149 and adjustable with respect to a tubular member 150 by means of a threaded spindle 151 and knob 152. The inward movement of the registering member 148 is produced by displacing the tubular member 150 axially, inwardly of the machine, by means of a rock shaft 153 (Fig. 15) which has secured thereon, at one end, an arm 154 (shown dotted) connected to the member 150 and, at the other end, an arm 155 operated by a link 156 having a roller 157 bearing on a cam 158 on the main cam shaft 17, which latter is embraced by the forked end 156a of the link 156.

When the cover sheet has thus been registered it is correctly disposed, as will be understood, with the centre line about which it is later to be folded vertically beneath the longitudinal centre line of the back of the filler which is brought thereover by the clamping and traversing means described above.

The filler and cover sheet being thus disposed, the former is moved vertically downwards on to the latter so that the back of the filler, which is covered with adhesive, is pressed on to the cover sheet. This vertical displacement of the filler is brought about by the U-shaped yoke 65 (Fig. 7) supporting the clamping and traversing means being lowered sufficiently to bring the lower portion of the filler between a pair of rollers 159 (Figs. 1 and 2) disposed above the divided table mentioned above which rollers are then brought together to grip said filler between them, being set in rotation in appropriate directions just before they grip the filler, so that they may feed same downwardly, it being understood that the filler-clamping means are released just as the rollers grip the filler. These rollers will be referred to in greater detail hereinafter in connection with additional adhesive-applying rollers yet to be referred to.

The cover sheet is supported against the pressure exerted thereon by the filler, the rollers mentioned being arrested while the filler is being pressed on the sheet, by means of the longitudinally divided horizontal table referred to above.

This table (see Figs. 11 and 12) comprises two halves 160 and 161 normally spaced apart and mounted for movement transversely of the machine towards and from each other, the one half 160 carrying on its underside at its inner longitudinal edge an inwardly extending spring-pressed plate or ledge 162 the upper surface of which is a short distance below the upper surface of the remainder of the divided table and the other half 161 having mounted on its underside a plate 163 of which the upper surface is in the same plane as the upper surface of the said ledge 162 and which is capable of a limited amount of movement towards the latter under the action of springs 164. The normal spacing of the two halves 160, 161 of the table is such that the inner longitudinal edges of the plates 162, 163 thereon will abut against each other under spring pressure and the cover sheet will be forced downwardly at its central portion, by the pressure of the filler thereon, between the opposed edges of the halves 160, 161 of the table.

During the said pressing of the filler on to the cover sheet the latter is supported beneath the area at which the pressure is applied thereto by the upper surfaces of the abutting plates 162, 163 on the respective halves of the divided table, the said halves of which are then displaced inwardly towards each other to cause the cover sheet to be turned upwardly still further about the back of the filler and then nipped tightly on to same between the inner longitudinal edges of the two table-halves.

The means for moving the table halves 160, 161 towards and from each other are illustrated in Fig. 12 and comprise a cam 165 on the main cam shaft 17 adapted to operate through a roller 166 and arm 167 in rocking a longitudinally disposed shaft 168, said shaft carrying a further arm 169 acted upon by a spring 170 for maintaining the roller 166 in contact with the cam 165. The shaft 168 also has secured thereon adjacent its ends a pair of toothed segments 171 meshing with rack teeth 172 formed on the underside of the table half 160, and carries a bevel gear 173 meshing with a bevel gear 174 on the end of a transversely disposed shaft 175 which carries at its opposite end a bevel gear 176 meshing with a bevel gear 177 on the end of a shaft 178 disposed parallel to and resembling in function the shaft 168. This shaft 178 has secured thereon a further pair of toothed segments 179 meshing with rack teeth 180 formed on the underside of a sliding member 181 to which the table half 161 is adjustably secured by means of screwed spindles 182. Said spindles 182 are adapted to be operated in unison by means of bevel gears 183 secured on their outer ends and meshing with bevel gears 184 secured on a shaft 185 mounted along the outer face of the member 181, the left-hand spindle 182 being extended outwardly to have secured thereon a crank-handle 186.

After the cover sheet has been nipped around the back of the filler by means of the table halves 160, 161 and the mechanism just described, the table halves are retracted by said mechanism to a sufficient extent to cause the spring-pressed plates 162, 163 thereon to lose contact with each other and leave a gap sufficiently wide for the filler and cover to pass through freely.

Disposed just beneath and one at either side of this gap are a pair of pressure rollers 187, 188 (Fig. 13) adapted to be driven in opposite directions suitable for delivering the filler and cover to a discharge chute 189 (Fig. 3A) disposed therebeneath. The filler and cover are pushed through the gap by further rotation of the rollers 159 (Fig. 1) disposed above the divided table 160, 161, which rollers 159 are adapted to release the filler just as the pressure rollers 187, 188 become operative. These rollers are mounted the one 187 to rotate about a fixed axis and the other 188 to rotate about an axis disposed parallel to said fixed axis but capable of movement towards or away from the same. The first roller 187 is adapted to be driven at the correct period by the movement of a lever 190 having a segmental toothed end 191 relatively to a pinion 192 secured on the shaft of said roller, with which pinion 192 the teeth of the lever 190, 191 engage, said lever being operated by a "railway" cam 193 on the main cam shaft 17. The drive from the first roller 187 to the second 188 is transmitted over a train of intermeshing gears and provision is made for the necessary movement of the second roller by supporting the shaft thereof in slidably disposed bearings 194. The one end of the shaft of the roller 187 has pivoted thereon the one end of a link 195, the other end of which is pivoted to the free end of a bell-crank-type link 196 which swings at its other end on the shaft of the second roller 188. The train of gears referred to comprises a pinion 197 secured on the shaft of the first roller 187 and a pinion 198 mounted to rotate about the pivotal axis of the connection between the two links 195, 196, and meshing both with the first pinion 197 and with a pinion 199 rotatably mounted on a pin 200 secured in the elbow of the bell-crank link 196, this last pinion 199 meshing with a pinion 201 secured on the shaft of the second roller 188.

The rollers 187, 188 are normally spaced apart sufficiently to allow the back of the covered filler to enter therebetween whereupon the rollers are moved towards each other to exert pressure on the covered filler and simultaneously driven to pass same out downwardly into the discharge chute 189 (Fig. 3A).

As shown in Fig. 13, the means for moving the roller 188 towards the roller 187 comprise a cam 202 mounted on the main cam shaft 17 and adapted to rock a lever 203, mounted on the shaft 40, by means of a roller 204, said lever 203 being connected by a link 205 to the lower end of an arm 206 which is secured at its upper end on a shaft 207 extending longitudinally of the machine. Said shaft 207 carries a pair of pinions 208 each meshing with a rock bar 209 through which extends freely a screwed spindle 210 which is threaded at its inner end into a block 211 (Fig. 14) from which one of the bearings 194 of the roller 188 is resiliently spaced by pins 212 having springs 213 therearound. By this means it is ensured that the roller 188 may yield away from the roller 187 should an excessive pressure develop between said rollers, 214 indicating the amount of play allowed to the roller 188 in the position of maximum separation of the rollers 187, 188. Adjustment of the degree of separation of the rollers is effected by rotation of the screwed spindles 210 each of which carries at its outer end a bevel gear 215 meshing with a bevel gear 216 secured on a shaft 217 mounted along the back of a bar 218 connecting the rack bars 209, the left-hand spindle 210 being extended rearwardly to have a crank-handle 219 secured thereon.

It will be seen that motion of the link 205 to the right in Fig. 13, under the action of a compression spring 220, when permitted by the cam 202, will cause the roller 188 to approach the roller 187 due to the rocking of the shaft 207 and the inward motion of the rack bars 209.

When additional strips of adhesive are to be applied to the filler adjacent the back thereof prior to its being pressed upon the cover sheet as above described, the additional detachably mounted adhesive-applying discs 109 shown in Fig. 8 are provided one on each side of the longitudinal centre line of the machine table. These discs are arranged to rotate about axes disposed in the same transverse plane of the machine but converging towards a point disposed beneath the machine table 1, the inner edges 221 of the discs 109 being bevelled at such an angle that the bevelled surface at the uppermost part of each thereof is vertically disposed. These bevelled surfaces 221 are immersed over the lower part of their circumference in the adhesive in the bath or tank 93 in which the back-glueing roller 94 rotates, the discs 109 being encountered by the filler 46 as it passes to said roller 94. The spacing between the vertical portions of the bevelled edges 221 of the discs 109 may be varied as desired to ensure that said portions will engage the end sheets of the filler adjacent the back thereof. Means, such as the slotted brackets 222, 223, may be provided for adjusting the discs 109 both vertically and laterally with respect to the back-glueing roller 94 to suit the requirements of any particular class of filler and cover sheet. 224 in Fig. 8 represents a glue-spreading brush for forcing the glue applied to the back of the filler 46 into the interstices between the sewn sections thereof during the passage of the filler from the glueing roller 94 to the position in which it is disposed above a cover sheet.

In the case where the filler is to be "covered", the additional adhesive-applying means just referred to may be dispensed with and others employed, disposed as follows:—

A pair of additional adhesive-containing tanks or boxes 225 (Figs. 1, 2 and 3A) are supported for transverse reciprocation one above each half of the divided table 160, 161 and provided with adhesive-applying rollers 159 each adapted to engage one end sheet of the book filler 46 as this is lowered towards the cover sheet by the clamping and traversing means, as above described in connection with the downwardly feeding rollers (also designated 159) with which the additional adhesive-applying rollers correspond. During this descent of the book filler the adhesive-containing tanks 225 and their rollers 159 are moved inwards to cause the latter to engage the said end sheets, the rollers then being set in rotation and feeding the filler downwardly until it is temporarily arrested for the period corresponding to the pressing of the back thereof on to the cover sheet, the drive to the rollers 159 being interrupted for this period. When the filler, and, incidentally, the cover sheet also, is moved downwardly again by fresh rotation of the rollers 159, the latter complete the application of the adhesive to the surfaces of the end sheets of the filler, whereupon the additional adhesive-containing tanks 225 are moved outwardly.

Referring to Fig. 15; the additional adhesive-containing tanks 225 (not shown in this figure) are adapted to be detachably secured one in each of the carriages 226, 227 mounted for reciprocation transversely of the machine in suitable horizontal guides. The carriage 226 has its forward or outer edge formed with lugs 228 to which are pivoted a pair of spaced links 229 connected at their outer ends to the upper ends of a pair of upwardly directed radial arms 230 mounted on the ends of a rock-shaft 231 extending longitudinally of the machine and adapted to be rocked by means of an arcuate lever 232 secured by its one end on the shaft and connected at its other end by a link 233 to the upper end of a lever 234 mounted on the shaft 40 and operated by a cam 235 on the main cam shaft 17.

On the other hand, however, the carriage 227 is adjustably connected to a bar 236 by screwed spindles 237 each of which carries a bevel gear 238 on its rear end meshing with a bevel gear 239 on a shaft 240, the latter having secured centrally thereon a bevel gear 241 (Fig. 3A) meshing with a bevel gear 242 on the lower end of a short vertical shaft carrying a crank-handle 243 at its upper end. The bar 236 is adapted to be operated similarly but in opposite direction to the carriage 226 by means comprising links 244 connecting the bar 236 to the upper ends of arms 245 mounted on a rockshaft 246 (see Fig. 3A) which is operated by a depending arm 247 and suitable links from the cam 235.

The arrangement described effects the movements of the additional adhesive-containing tanks 225 and rollers 159 towards and from each other at the correct periods and the following mechanism produces the desired rotations of the said rollers.

Each roller 159 is mounted in bearings formed on one of the tanks 225 and has its shaft formed at one end as the one half of a readily disengageable coupling, the other half of which is shown at 248 (Fig. 15). These coupling halves 248 are formed on the inner ends of two short axially, displaceable, parallel-disposed, shafts 249 which each have a sliding key connection with a helical gear wheel 250 mounted in a bracket member 251 arranged to slide on a transverse shaft 252 and embrace a helical gear wheel 253 meshing with the corresponding gear 250. These helical gears 253 are of opposite "hand" and have a sliding key connection with the shaft 252 which is supported in brackets 254 mounted one at the front and one at the rear of the machine, respectively. The bracket 254 at the front of the machine, constitutes also a vertical guide for a rack bar 255 which meshes with a pinion 256 secured to the outer face of a disc 257 mounted for free rotation on the shaft 252. Said disc 257 carries on its inner face a spring-pressed pivoted pawl 258 (Fig. 15) adapted to engage a ratchet wheel 259 keyed on the shaft 252 and drive same when the rack bar 255 is raised by means of a link 260 which is operated by a cam 261 on the cam shaft 17, acting through a roller 262. The link 260 is pivoted at its inner end on a fixed pin 263 and at its outer end on the end of a downward extension 264 of the rack bar 255, a spring 265 being provided to produce the downward motion of the link 260, during which the disc 257 rotates idly on the shaft 252 due to the pawl 258 sliding over the teeth of the ratchet wheel 259.

It will be seen that the motions of the rack bar 255, produced at the correct periods by the cam 261, will cause the rotations of the rollers 159 which have been described above at all positions of adjustment of said rollers with respect to the longitudinal centre line of the machine.

On the passage of the filler and the adhering cover sheet between the pressure-applying rollers 197, 198, which are disposed beneath the divided table 160, 161, as above described, the cover sheet is firmly pressed on to the layer of adhesive applied to the end sheets of the filler and the covered book is discharged to the delivery chute 199 (Fig. 3A).

It will be understood that the additional adhesive-containing tanks 225 can be employed even when the machine is only intended to effect wrappering operations, the tanks being drained of adhesive and the rollers run in the dry state.

In connection with the description of all the mechanism above referred to, it should be pointed out that in all those cases where there is a likelihood of small variations in the sizes of the fillers being dealt with causing damage to the parts, as is especially the case in the clamping, nipping or like operations, the clamping, nipping or the like is effected by spring pressure, the control cams being merely employed to retract the parts against the action of the springs and to determine the periods of action of the devices concerned.

Furthermore, all those devices which deal with the fillers themselves are made adjustable to suit various sizes and thicknesses thereof, it being pointed out in this connection that the adjustments are all made at the rear side of the longitudinal centre line of the machine, i. e. only one of the members of a pair, and that the rearmost one, is moved for adjustment purposes. The adjustment in the case of the clamping means is effected by replacing the clamping box 80 by another of lesser or greater thickness, said boxes having a front flap 80a (Fig. 6) hung from their upper inner edges. This flap 80a is beveled at the lower edge 80b so that when the clamping means is disposed above the rollers 159 and descends towards same, the flap may clear the adjacent roller or move with same inwardly about its pivotal connection to the box 80 proper.

On the left-hand end of the cam shaft 17, Fig. 1, there is secured a helical gear 266 which meshes with a similar gear (not shown) secured on the transverse shaft 123 referred to above, said shaft serving to effect the operation of the feeding devices for the cover sheets on the table 111.

The motions of the carriage 128 carrying the suction devices 129 are produced by means of a cam 267 on the shaft 123 (Fig. 9), which cam acts on a roller 268 on a forked link 269 to rock a lever 270 about a pivot 271 on the bracket member 110, the upper end of said lever 270, being connected by a link 272 to the carriage 128 which is supported by rollers 273 bearing on the tracks 130. A spring 274 serves to maintain the roller 268 in contact with the cam 267. The mechanism designated by 267 to 274 is repeated on both front and rear of the machine, as will be understood.

As can be seen from Fig. 2, the suction devices 129 are mounted on a tubular member 275 which is connected by a flexible tube 276 to a pipe 277 leading to an exhausting pump 278 mounted in the base of the machine (see Figs. 1 and 3A) and driven from the motor 62 by a belt 279.

The drive to the machine is imparted through a belt pulley 280 (Figs. 1A, 2A and 3) and spur reduction gearing 281 to the main cam shaft 17.

We claim:—

1. A machine for operating upon the fillers of books, periodicals and the like, comprising a rack for supporting a number of fillers with the backs directed downwards, means for clamping and longitudinally traversing a filler, means for transferring a filler from the supporting rack to a position in which it may be clamped by said clamping and traversing means with its back still directed downwards, mechanism for operating the last-mentioned means to clamp the transferred filler, mechanism for displacing said clamping and traversing means in a rectilinear path, an adhesive-applying device disposed in the path of movement of said clamping and traversing means so that it is engaged by the back of the clamped filler during the longitudinal movement thereof, means for supporting a pile of cover sheets, means for feeding the topmost sheet of the pile to a position in which it is disposed beneath the filler when this reaches the end of its travel, means for lowering the clamping and traversing means at the end of its travel to engage the filler with feed members, means for rendering the said clamping and traversing means inoperative for clamping the filler, means for simultaneously actuating said feed members to displace the filler downwardly and press the back thereof on to the positioned cover sheet, means for folding the said cover sheet upwardly around the filler and means for delivering the filler thus provided with a cover to a discharge chute.

2. A machine according to claim 1, including additional adhesive-applying devices disposed one on each side of the path of movement of the clamped filler in such positions that they apply a coating strip of adhesive to the end sheets of the filler, adjacent the back thereof, during its longitudinal movement.

3. A machine for operating upon the fillers of books, periodicals and the like, comprising a rack for supporting a number of fillers with the backs directed downwards, means for clamping and longitudinally traversing a filler, means for transferring a filler from the supporting rack to a position in which it may be clamped by said clamping and traversing means with its back still directed downwards, mechanism for operating the last-mentioned means to clamp the transferred filler, mechanism for displacing said clamping and traversing means in a rectilinear path, an adhesive-applying device disposed in the path of movement of said clamping and traversing means so that it is engaged by the back of the clamped filler during the longitudinal movement thereof, means for supporting a pile of cover sheets, means for feeding the topmost sheet of the pile to a position in which it is disposed beneath the filler when this reaches the end of its travel, means for pressing the back of the filler on to said cover sheet, said means comprising a pair of co-operating rollers adapted to grip the filler and feed same downwardly, means for rendering the clamping and traversing means inoperative for clamping the filler and further means operated simultaneously therewith for rendering the cooperating rollers operative for pressing the back of the filler on to the cover sheet, means for folding the cover sheet upwardly around the filler and means for delivering the filler thus provided with a cover to a discharge chute.

4. A machine according to claim 4, wherein the pair of co-operating rollers adapted to feed the filler downwardly to the cover sheet are arranged to apply a coating of adhesive to the end sheets of the filler during their rotation.

5. A machine for applying cover sheets to the fillers of books, periodicals and the like, comprising a rack for supporting a plurality of fillers, back downwards, means for transferring the leading filler to a support disposed on the longitudinal centre line of the machine, said filler being then disposed with its medial plane coincident with a vertical plane containing said centre line, means for clamping a filler arranged for movement along said centre line, means for displacing the filler longitudinally from the support to a position in which it may be engaged by said clamping means, means for operating the latter to clamp the filler, means for displacing the clamping means lengthwise of the machine to a position above a table adapted to support a cover sheet, means for supporting a pile of cover sheets, means for transferring the topmost sheet from the pile to the table, adhesive-applying and adhesive-spreading devices disposed on the centre line of the machine so that they are adapted to be engaged in this order by the back of the filler during its traverse, means for depressing the clamping means to bring the filler into a position in which it may be engaged by a pair of co-operating rollers, means for releasing the clamping means, means for simultaneously operating the co-operating rollers to cause them to grip the filler and feed same downwardly so that its back is pressed on the cover sheet, means for nipping the cover sheet adjacent the back of the filler to fold said sheet upwardly somewhat about the latter, means for again operating the co-operating rollers so that they continue to feed the filler downwardly, a discharge chute, and a further pair of co-operating rollers adapted to receive the filler from the first-mentioned pair and complete the upward folding of the cover sheet about the filler while delivering same to said discharge chute.

6. A machine as claimed in claim 5, including additional adhesive-applying devices comprising beveled discs arranged on opposite sides of the path of travel of the clamped filler and adapted to apply a strip of adhesive to each end sheet of the filler adjacent the back thereof during its traverse.

7. A machine as claimed in claim 5, including means for supplying adhesive to the first-mentioned pair of co-operating rollers so that these latter may apply a coating of adhesive to the end sheets of the filler as they feed it downwardly.

8. A machine as claimed in claim 5, including means for feeding the fillers supported on the rack towards the longitudinally disposed support, and means for maintaining the height of the pile of cover sheets substantially constant.

9. A machine as claimed in claim 5, including registering means for ensuring that the cover sheet is correctly disposed before the filler is pressed thereon.

10. A machine as claimed in claim 5, wherein the means for successively transferring the fillers from the rack to the longitudinally extending support and the means for successively transferring the cover sheets from the pile thereof to a position beneath the end of the path of travel of the clamped fillers comprise suction cups adapted to be connected in timed relation to sources of reduced pressure and to the atmosphere, alternately.

11. A machine for operating upon the fillers of books, periodicals and the like, comprising means for clamping and longitudinally traversing a filler, means for successively feeding one filler at a time, back downwards, to a position in which it may be clamped by said clamping and traversing means, mechanism for operating the last mentioned means to clamp the said filler, mechanism for displacing said clamping and traversing means longitudinally of the machine, an adhesive-applying device disposed in the path of movement of said clamping and traversing means so that it is engaged by the back of the clamped filler during the longitudinal movement thereof, means for supporting a pile of cover sheets, means for feeding the topmost sheet of the pile to a position in which it is disposed beneath the filler when this reaches the end of its travel, mechanism for operating the clamping and traversing means to release the filler, feed means adapted to receive the released filler and press the back thereof on to the positioned cover sheet, means for folding the cover sheet upwardly around the filler, a discharge chute and means for delivering the filler provided with the cover to said discharge chute.

12. A machine as claimed in claim 11, including further means for applying a coating strip of adhesive to each end sheet of the filler adjacent the back thereof during the traverse of the filler.

13. A machine as claimed in claim 11, wherein the feed means are adapted to apply a coating of adhesive to the end sheets of the filler and means are provided for pressing the upwardly folded cover sheet on to the said end sheets of the filler during its delivery to said discharge chute.

HENRY WILLIAM PEARTON.
HARRY MILLS.